United States Patent [19]
Ishii

[11] Patent Number: 5,416,802
[45] Date of Patent: May 16, 1995

[54] RECEIVER CIRCUIT FOR DIGITAL AND ANALOG MODULATED SIGNAL

[75] Inventor: Junichi Ishii, Tokyo, Japan

[73] Assignee: NEC Corporation, Tokyo, Japan

[21] Appl. No.: 63,694

[22] Filed: May 20, 1993

[30] Foreign Application Priority Data

May 20, 1992 [JP] Japan .................. 4-152931

[51] Int. Cl.⁶ .......................................... H04L 27/06
[52] U.S. Cl. .................... 375/316; 375/216; 455/212
[58] Field of Search ........... 375/5, 75; 455/33.1, 455/212, 218, 221; 379/58, 59; 381/120

[56] References Cited

U.S. PATENT DOCUMENTS 4,355,401 10/1982 Ikoma et al. .................. 375/5
4,748,685 5/1988 Rozanski, Jr. ................. 375/5

OTHER PUBLICATIONS

White Series No. 105, Digital Modulation and Demodulation Technology for Mobile Communication, Published by TRIKEPS, Ltd. Mar. 14, 1990.

Primary Examiner—Stephen Chin
Assistant Examiner—Don N. Vo
Attorney, Agent, or Firm—Sughrue, Mion, Zinn, Macpeak & Seas

[57] ABSTRACT

A receiver circuit for receiving both digital and analog modulated signals has a high frequency amplifier for amplifying digital and analog modulated high frequency signals, a down conversion block for converting an output signal from the high frequency amplifier into an intermediate frequency signal, a root Nyquist bandpass filter for limiting the intermediate frequency signal from the down conversion block to a frequency band based on root Nyquist characteristics, an intermediate frequency signal linear amplifier for linearly amplifying the intermediate frequency signal from the root Nyquist bandpass filter, a limiter amplifier for limiting to a constant amplitude the intermediate frequency signal from the intermediate frequency signal linear amplifier, a received signal intensity detector for detecting received signal intensity information from the intermediate frequency signal from the intermediate frequency signal linear amplifier, a synchronizing clock signal generator for generating a synchronizing clock signal from the received signal intensity information from the received signal intensity detector, a digital demodulator for demodulating a digital modulated intermediate frequency signal from the limiter amplifier based on the synchronizing clock signal, and an analog demodulator for demodulating an analog modulated intermediate frequency signal from the limiter amplifier.

6 Claims, 3 Drawing Sheets

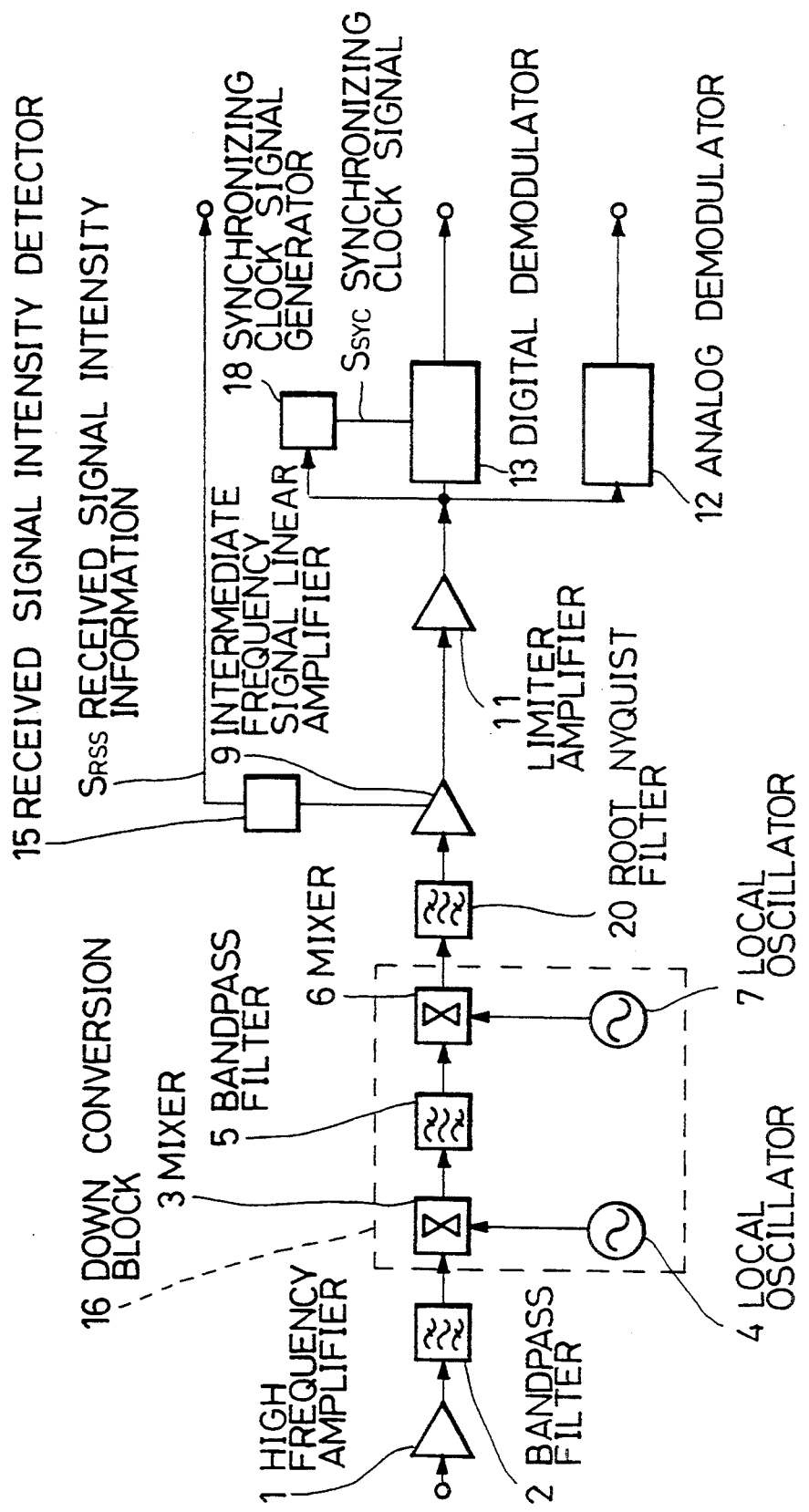

RECEIVER CIRCUIT FOR DIGITAL AND ANALOG MODULATED SIGNAL

BACKGROUND OF THE INVENTION

1. Filed of the Invention

The present invention relates to a receiver circuit for receiving an analog modulated signal as well as a digital modulated signal.

2. Description of the Related Art

Cellular communication systems that are currently in service as mobile radio communication systems are required to increase system capacity as the number of subscribers increases. To meet this need, a switch from the conventional analog cellular communication systems to digital cellular communication systems is taking place in various countries in North America, Europe, and in Japan. In North America, both analog and digital cellular communication systems employ the same frequency band, and cellular terminals must therefore be dual-mode devices capable of connecting with analog and digital cellular communication systems.

FIG. 1 of the accompanying drawings shows a receiver circuit of a conventional dual-mode device. The receiver circuit comprises a high frequency amplifier 1, a bandpass filter 2, a down conversion block 16, intermediate frequency bandpass filters 8, 10, an intermediate frequency signal linear amplifier 9, a limiter amplifier 11, an analog demodulator 12, an automatic-gain-control amplifier 19, a digital demodulator 14, and a received signal intensity detector 15. The received signal intensity detector 15 outputs received signal intensity information $S_{RSS}$. The down conversion block 16 comprises mixers 3, 6, local oscillators 4, 7, and a bandpass filter 5.

The receiver circuit shown in FIG. 1 operates as follows:

A digital modulated signal that has been received is amplified by the high frequency amplifier 1 and then limited to a certain received frequency band by the bandpass filter 2. The digital modulated signal is thereafter converted into an intermediate frequency signal by the down conversion block 16. The digital modulated intermediate frequency signal from the down conversion block 16 is passed through the intermediate frequency bandpass filter 8 and applied to the intermediate frequency signal linear amplifier 9, which linearly amplifies the applied signal. The amplified signal from the intermediate frequency signal linear amplifier 9 is again limited to a frequency band by the intermediate frequency bandpass filter 10. The digital modulated intermediate frequency signal from the intermediate frequency bandpass filter 10 is then linearly amplified by the automatic gain control amplifier 19. The digital demodulator 14 produces I and Q signals from the amplified signal from the automatic gain control amplifier 19. The I and Q signals pass through respective root Nyquist filters (not shown), which output orthogonally demodulated signals. An analog modulated signal that has been received is processed into an intermediate frequency signal by the same circuit components as the digital modulated signal up to the intermediate frequency bandpass filter 10. The intermediate frequency signal produced from the analog modulated signal is then limited to a certain amplitude and amplified by the limiter amplifier 11 and demodulated into an analog demodulated signal by the analog demodulator 12.

A conventional receiver circuit capable of receiving both digital and analog modulated signals is composed of many parts and is complex in circuit arrangement because for digital signal demodulation it requires the automatic gain control amplifier for linearly amplifying the intermediate frequency signal and the bandpass filter having characteristics approximating root Nyquist characteristics to limit the frequency bands of the I and Q signals, and for analog signal demodulation, it also requires the limiter amplifier for limiting and amplifying the intermediate frequency signal.

SUMMARY OF THE INVENTION

It is therefore an object of the present invention to provide a receiver circuit for receiving both digital and analog modulated signals which is made up of a relatively small number of parts and is of a relatively simple circuit arrangement.

To achieve the above object, in accordance with the present invention, there is provided a receiver circuit for receiving both digital and analog modulated signals that comprises a frequency converter for converting digital and analog modulated high frequency signals into respective intermediate frequency signals, a root Nyquist bandpass filter for limiting an intermediate frequency signal from the frequency converter to a frequency band based on root Nyquist characteristics, an intermediate frequency signal linear amplifier for linearly amplifying the intermediate frequency signal that has passed through the root Nyquist bandpass filter, a limiter amplifier for limiting to a constant amplitude the intermediate frequency signal from the intermediate frequency signal linear amplifier, a digital demodulator connected to the limiter amplifier for demodulating a digital modulated intermediate frequency signal from the limiter amplifier, and an analog demodulator connected to the limiter amplifier parallel to the digital demodulator for demodulating an analog modulated intermediate frequency signal from the limiter amplifier.

The receiver circuit may further comprise a received signal intensity detector for detecting received signal intensity information from the intermediate frequency signal amplified by the intermediate frequency signal linear amplifier.

The receiver circuit may further comprise a first synchronizing clock signal generator for generating a synchronizing clock signal from the received signal intensity information detected by the received signal intensity detector and applying the synchronizing clock signal to the digital demodulator.

The receiver circuit may further comprise a second synchronizing clock signal generator for generating a synchronizing clock signal from the digital modulated intermediate frequency signal from the limiter amplifier and applying the synchronizing clock signal to the digital demodulator.

The receiver circuit may further comprise a high frequency amplifier for amplifying the digital and analog modulated high frequency signals and applying said amplified high frequency signals to said frequency converter.

The receiver circuit may further comprise a bandpass filter connected between said high frequency amplifier and said frequency converter for limiting an output signal from said high frequency amplifier to a predetermined frequency band.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a block diagram of a receiver circuit for receiving both digital and analog modulated signals according to a second embodiment of the present invention.

DETAILED DESCRIPTION OF THE PREFERRED EMBODIMENTS

Figure 1:
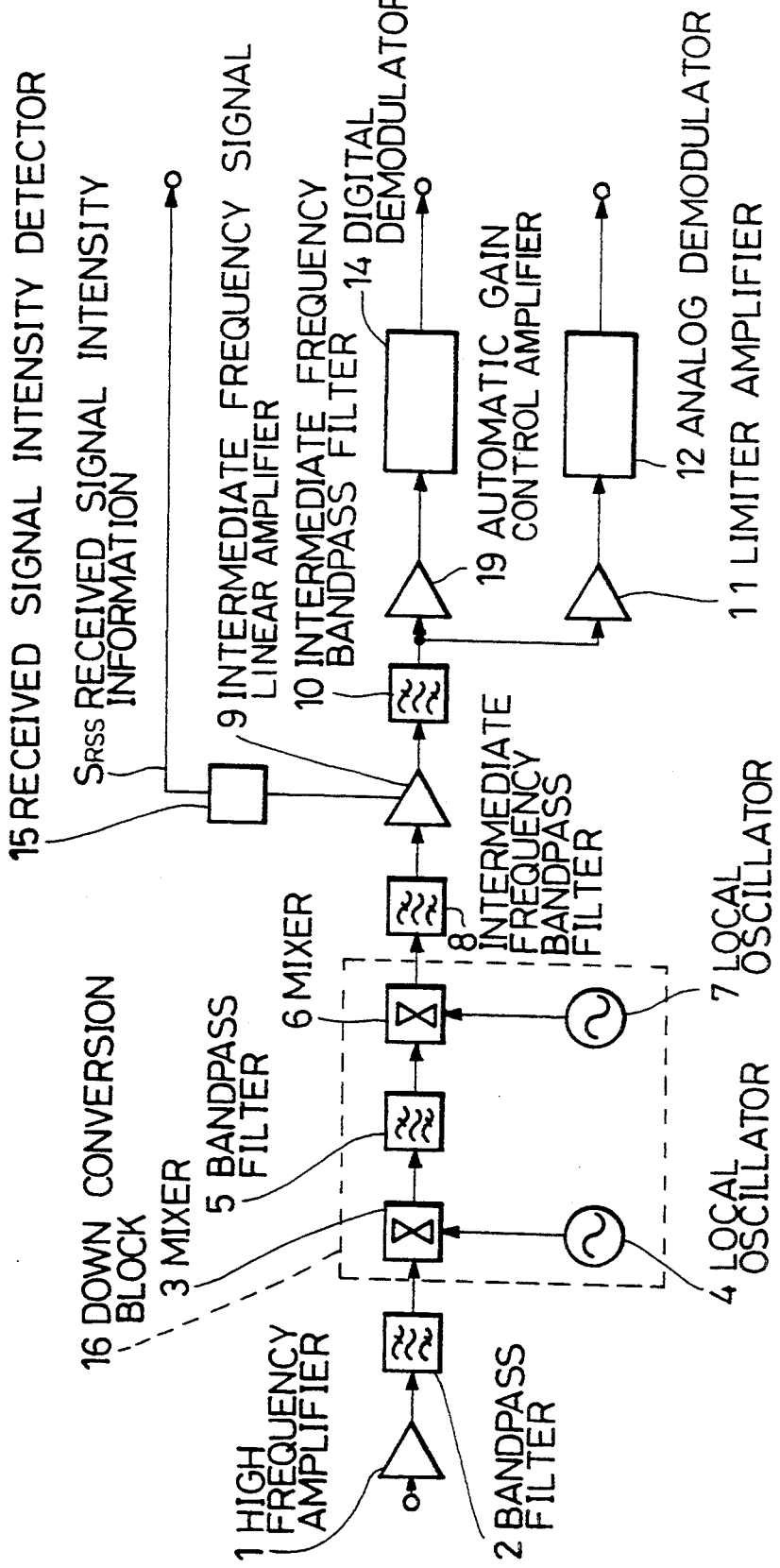
FIG. 1 is a block diagram of a conventional receiver circuit for receiving both digital and analog modulated signals.
Figure 2:
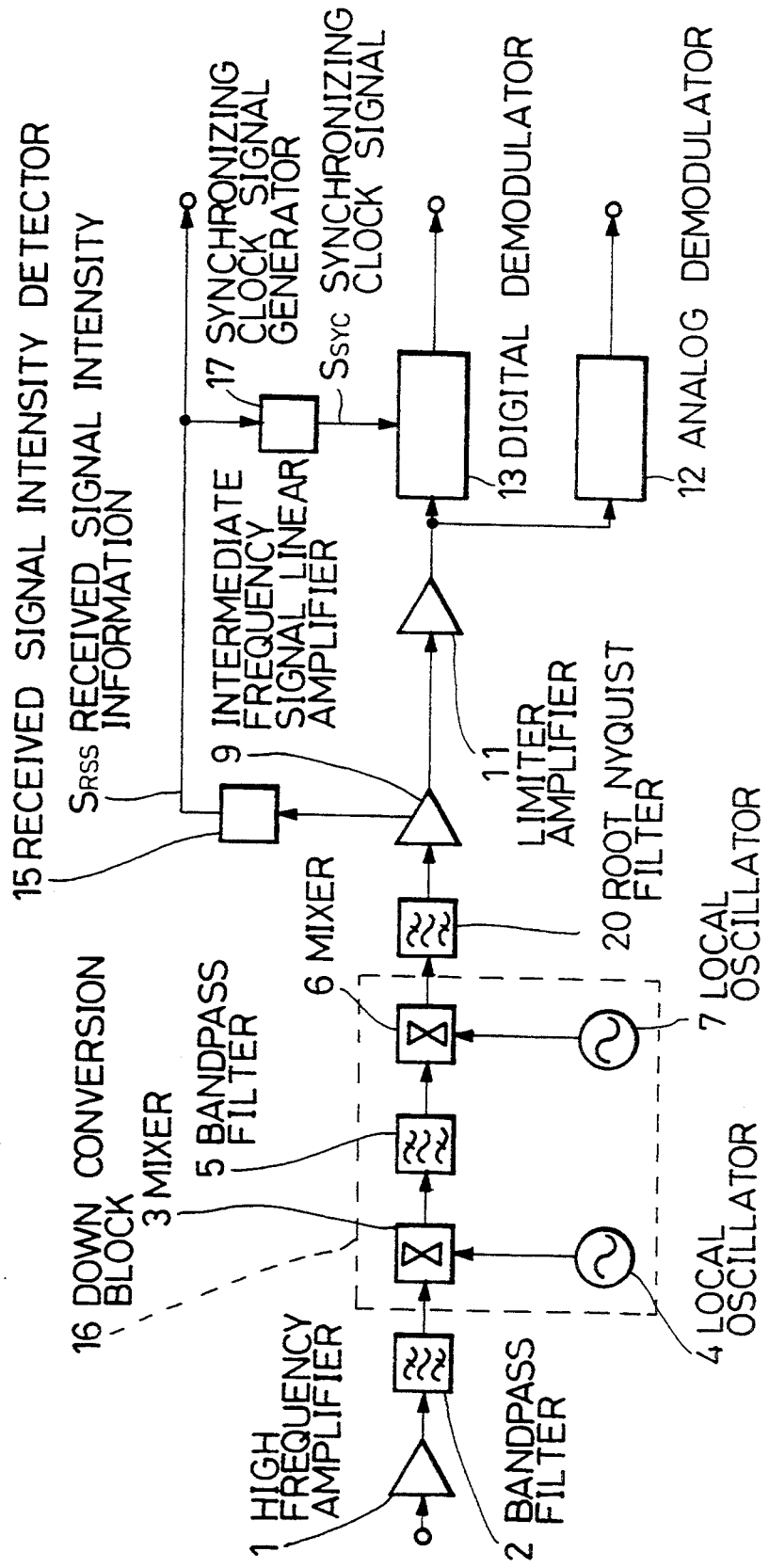
FIG. 2 is a block diagram of a receiver circuit for receiving both digital and analog modulated signals according to a first embodiment of the present invention.

FIG. 2 shows in block form a receiver circuit for receiving both digital and analog modulated signals according to a first embodiment of the present invention. Those parts shown in FIG. 2 which are identical to those of the conventional receiver circuit shown in FIG. 1 are denoted by identical reference numerals.

The receiver circuit shown in FIG. 2 comprises a high frequency amplifier 1, a bandpass filter 2, a down conversion block 16, an intermediate frequency signal linear amplifier 9, a limiter amplifier 11, an analog demodulator 12, a digital demodulator 13, and a received signal intensity detector 15. The received signal intensity detector 15 outputs received signal intensity information $S_{RSS}$. The down conversion block 16 comprises mixers 3, 6, local oscillators 4, 7, and a bandpass filter 5.

A root Nyquist bandpass filter 20 is connected to an input terminal of the intermediate frequency signal linear amplifier 9. The received signal intensity information $S_{RSS}$ from the received signal intensity detector 15 is supplied to a synchronizing clock signal generator 17 which applies a synchronizing clock signal $S_{SYC}$ to the digital demodulator 13.

A digital modulated signal that has been received is amplified by the high frequency amplifier 1 and then limited to a certain received frequency band by the bandpass filter 2. The digital modulated signal is thereafter converted into an intermediate frequency signal by the down conversion block 16. The digital modulated intermediate frequency signal from the down conversion block 16 is limited to a frequency band by the root Nyquist bandpass filter 20 with root Nyquist characteristics. Since it is impossible for the root Nyquist bandpass filter 20 to have complete root Nyquist characteristics, the root Nyquist bandpass filter 20 has characteristics approximate to root Nyquist characteristics having an attenuation rate of $1/\sqrt{2}$ at a frequency which is ½ the symbol rate.

An output signal from the root Nyquist bandpass filter 20 is applied to the intermediate frequency signal linear amplifier 9, which linearly amplifies the applied signal. The amplified signal from the intermediate frequency signal linear amplifier 9 is limited to a certain amplitude and amplified by the limiter amplifier 11. For digital signal demodulation, the received signal intensity information $S_{RSS}$ from the received signal intensity detector 15 is supplied to the synchronizing clock signal generator 17. The synchronizing clock signal $S_{SYC}$ from the synchronizing clock signal generator 17 and the output signal from the limiter amplifier 11 are applied to the digital demodulator 13, which produces a digital demodulated signal.

An analog modulated signal that has been received is processed into an intermediate frequency signal by the same circuit components as the digital modulated signal up to the limiter amplifier 11. The output signal from the limiter amplifier 11 is applied to the analog modulator 12, which produces an analog demodulated signal.

FIG. 3 shows in block form a receiver circuit for receiving both digital and analog modulated signals according to a second embodiment of the present invention. The receiver circuit shown in FIG. 3 differs from the receiver circuit shown in FIG. 2 in that the output signal from the limiter amplifier 11 is applied to a synchronizing clock signal generator 18 which generates a synchronizing clock signal $S_{SYC}$ and supplies it to the digital demodulator 13.

A digital modulated signal that has been received is converted into an intermediate frequency signal which is passed through the root Nyquist bandpass filter 20 and then amplified by the intermediate frequency signal linear amplifier 9, as with the first embodiment. The amplified signal from the intermediate frequency signal linear amplifier 9 is limited to a certain amplitude and amplified by the limiter amplifier 11. The amplified signal from the limiter amplifier 11 is supplied to the synchronizing clock signal generator 18, the digital demodulator 13, and the analog demodulator 12. The digital demodulator 13 demodulates the signal from the limiter amplifier 11 into a digital demodulated signal with the synchronizing clock signal $S_{SYC}$ from the synchronizing clock signal generator 18.

The analog demodulator 12 demodulates the signal from the limiter amplifier 11 into an analog demodulated signal.

Although certain preferred embodiments of the present invention have been shown and described in detail, it should be understood that various changes and modifications may be made therein without departing from the scope of the appended claims.

What is claimed is:

1. A receiver circuit for receiving both digital and analog modulated signals, comprising:
    a frequency converter for converting digital and analog modulated high frequency signals into respective intermediate frequency signals;
    a root Nyquist bandpass filter for limiting the intermediate frequency signal from said frequency converter to a frequency band based on root Nyquist characteristics;
    an intermediate frequency signal linear amplifier for linearly amplifying the intermediate frequency signal that has passed through said root Nyquist bandpass filter;
    a limiter amplifier for limiting to a constant amplitude the intermediate frequency signal from said intermediate frequency signal linear amplifier;
    a digital demodulator connected to said limiter amplifier for demodulating the digital modulated intermediate frequency signal from said limiter amplifier; and
    an analog demodulator connected to said limiter amplifier parallel to said digital demodulator for demodulating the analog modulated intermediate frequency signal from said limiter amplifier.

2. A receiver circuit according to claim 1 that further comprises a received signal intensity detector for detecting received signal intensity information from the intermediate frequency signal amplified by said intermediate frequency signal linear amplifier.

3. A receiver circuit according to claim 2 that further comprises a first synchronizing clock signal generator for generating a synchronizing clock signal from the received signal intensity information detected by said received signal intensity detector and applying said synchronizing clock signal to said digital demodulator.

4. A receiver circuit according to claim 1 or 2 that further comprises a second synchronizing clock signal generator for generating a synchronizing clock signal from the digital modulated intermediate frequency signal from said limiter amplifier and applying said synchronizing clock signal to said digital demodulator.

5. A receiver circuit according to claim 1 that further comprises a high frequency amplifier for amplifying the digital and analog modulated high frequency signals and applying the amplified high frequency signals to said frequency converter.

6. A receiver circuit according to claim 5 that further comprises a bandpass filter connected between said high frequency amplifier and said frequency converter for limiting an output signal from said high frequency amplifier to a predetermined frequency band.

* * * * *